(12) United States Patent
Xu

(10) Patent No.: US 9,171,068 B2
(45) Date of Patent: *Oct. 27, 2015

(54) RECOMMENDING PERSONALLY INTERESTED CONTENTS BY TEXT MINING, FILTERING, AND INTERFACES

(71) Applicant: UT-Battelle, LLC, Oak Ridge, TN (US)

(72) Inventor: Songhua Xu, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 308 days.

This patent is subject to a terminal disclaimer.

(21) Appl. No.: 13/785,117

(22) Filed: Mar. 5, 2013

(65) Prior Publication Data

US 2013/0254217 A1  Sep. 26, 2013

Related U.S. Application Data

(60) Provisional application No. 61/607,800, filed on Mar. 7, 2012.

(51) Int. Cl.
*G06F 17/30* (2006.01)

(52) U.S. Cl.
CPC .... *G06F 17/30699* (2013.01); *G06F 17/30867* (2013.01)

(58) Field of Classification Search
CPC ..................... G06F 17/30699; G06F 17/30867
USPC ........................................................ 707/754
See application file for complete search history.

(56) References Cited

U.S. PATENT DOCUMENTS

| | | | |
|---|---|---|---|
| 6,438,579 B1 * | 8/2002 | Hosken | 709/203 |
| 7,328,216 B2 | 2/2008 | Hofmann et al. | |
| 8,019,777 B2 | 9/2011 | Hauser | |
| 8,086,628 B2 | 12/2011 | Allen et al. | |
| 8,930,393 B1 * | 1/2015 | Nordstrom et al. | 707/767 |
| 2001/0054054 A1 | 12/2001 | Olson | |

(Continued)

FOREIGN PATENT DOCUMENTS

GB  2 437 327 A  10/2007

OTHER PUBLICATIONS

Abstract entitled "Mining User Dwell Time for Personalized eb Search Re-Ranking", by Xu et al., dated Jan. 1, 2011.*

(Continued)

*Primary Examiner* — Mahesh Dwivedi
(74) *Attorney, Agent, or Firm* — Brinks Gilson & Lione

(57) ABSTRACT

A personalized content recommendation system includes a client interface device configured to monitor a user's information data stream. A collaborative filter remote from the client interface device generates automated predictions about the interests of the user. A database server stores personal behavioral profiles and user's preferences based on a plurality of monitored past behaviors and an output of the collaborative user personal interest inference engine. A programmed personal content recommendation server filters items in an incoming information stream with the personal behavioral profile and identifies only those items of the incoming information stream that substantially matches the personal behavioral profile. The identified personally relevant content is then recommended to the user following some priority that may consider the similarity between the personal interest matches, the context of the user information consumption behaviors that may be shown by the user's content consumption mode.

22 Claims, 3 Drawing Sheets

(56) References Cited

U.S. PATENT DOCUMENTS

| | | | |
|---|---|---|---|
| 2006/0224552 A1* | 10/2006 | Riezler et al. | 707/1 |
| 2007/0106656 A1* | 5/2007 | Gutta | 707/5 |
| 2009/0011740 A1 | 1/2009 | Aggarwal et al. | |
| 2009/0132453 A1* | 5/2009 | Hangartner et al. | 706/46 |
| 2009/0248494 A1* | 10/2009 | Hueter et al. | 705/10 |
| 2010/0082684 A1 | 4/2010 | Churchill et al. | |
| 2010/0250578 A1* | 9/2010 | Athsani et al. | 707/765 |
| 2010/0281427 A1* | 11/2010 | Ghosh et al. | 715/811 |
| 2011/0213762 A1 | 9/2011 | Sherrets et al. | |
| 2011/0295843 A1* | 12/2011 | Ingrassia et al. | 707/723 |

OTHER PUBLICATIONS

Article entitled "A User-Oriented Webpage Ranking Algorithm Based on User Attention Time", by Xu et al., dated 2008).*

Aggarwal, Charu C. et al., "An Automated System for Web Portal Personalization," Proceedings of the 28th VLDB Conference, Hong Kong, China, 2002, 10 pages.

Alham, Nasullah Khalid et al., "Evaluating Machine Learning Techniques for Automatic Image Annotations," 2009 Sixth International Conference on Fuzzy Systems and Knowledge Discovery, IEEE Computer Society, 2009, pp. 245-249.

Bodenreider, Olivier et al., "Bio-ontologies: Current Trends and Future Directions," Briefings in Bioinformatics, vol. 7, No. 3, 2006, pp. 256-274.

Burke, Robin, "Hybrid Systems for Personalized Recommendations," Eds. B. Mobasher and S.S. Anand, ITWP 2003, LNAI 3169, Springer-Verlag, Berlin Heidelberg, 2005, pp. 133-152.

Chang, Edward et al., "CBSA: Content-Based Soft Annotation for Multimodal Image Retrieval Using Bayes Point Machines," IEEE Transactions on Circuits and Systems for Video Technology, vol. 13, No. 1, 2003, pp. 26-38.

Clukey, Steven et al., "Recommending Images of User Interests from the Biomedical Literature," Proceedings of the SPIE, vol. 8674, 2013, 9 pages.

Cusano, Claudio et al., "Image Annotation Using SVM," Electronic Imaging 2004, International Society for Optics and Photonics, 2003, 9 pages.

Dai, Honghua (Kathy) et al., "A Road Map to More Effective Web Personalization: Integrating Domain Knowledge with Web Usage Mining," Proceedings of the International Conference on Internet Computing 2003, Las Vegas, Nevada, 2003, 8 pages.

Daoud, M. et al., "A Session Based Personalized Search Using an Ontological User Profile," SAC'09, Mar. 8-12, 2009, Honolulu, Hawaii, ACM, pp. 1732-1736.

Daoud, Mariam et al., "Learning Implicit User Interests Using Ontology and Search History for Personalization," WISE'07, Springer, 2007, 12 pages.

Datta, Ritendra et al., "Content-Based Image Retrieval—Approaches and Trends of the New Age," MIR'05, Nov. 11-12, 2005, Singapore, ACM, pp. 253-262.

Dou, Z. et al, "A Largescale Evaluation and Analysis of Personalized Search Strategies," WWW '07, 2007, pp. 581-590.

Duygulu, P. et al., "Object Recognition as Machine Translation: Learning a Lexicon for a Fixed Image Vocabulary," Computer VisionECCV 2002, 2006, 15 pages.

Fan, Jianping et al., "JustClick: Personalized Image Recommendation Via Exploratory Search from Large-Scale Flickr Images," IEEE Transactions on Circuits and Systems for Video Technology, vol. 19, No. 2, 2009, pp. 273-288.

Gabrilovich, Evgeniy et al., "Computing Semantic Relatedness using Wikipedia-based Explicit Semantic Analysis," in IJCAI'07, 2007, pp. 1606-1611.

Gao, Yuli et al., "An Interactive Approach for Filtering Out Junk Images from Keyword-based Google Search Results," IEEE Transactions on Circuits and Systems for Video Technology, vol. 19, No. 12, 2009, pp. 1851-1865.

Jeon, J. et al., "Automatic Image Annotation and Retrieval Using Cross-Media Relevance Models," SIGIR'03, Jul. 28-Aug. 1, 2003, Toronto, Canada, ACM, pp. 119-126.

Jeon, Jiwoon et al., "Using Maximum Entropy for Automatic Image Annotation," Computer Science Department Faculty Publication Series, Paper 136, 2004, 10 pages.

Jin, Rong et al., "Effective Automatic Image Annotation Via a Coherent Language Model and Active Learning," MM'04, Oct. 10-16, 2004, New York, New York, ACM, pp. 892-899.

Joachims, Thorsten et al., "Search Engines that Learn from Implicit Feedback," IEEE Computer Society, 2007, pp. 34-40.

Kang, Feng, "Automatic Image Annotation," Dissertation submitted to Michigan State University, Department of Computer Science, UMI No. 3282132, 2007, 102 pages.

Kelly, D. et al., "Display Time as Implicit Feedback: Understanding Task Effects," in SIGIR'04, 2004, pp. 377-384.

Kennedy, Lyndon S., "To Search or to Label?: Predicting the Performance of Search-Based Automatic Image Classifiers," MIR'06, Oct. 26-27, 2006, Santa Barbara, California, ACM, pp. 249-258.

Lavrenko, V. et al., "A Model for Learning the Semantics of Pictures," NIPS, 2003, 8 pages.

Lee, Wei-Po et al., "Intelligent Agent-Based Systems for Personalized Recommendations in Internet Commerce," Expert Systems with Applications, vol. 22, 2002, pp. 275-284.

Lerman, Kristina et al., "Personalizing Image Search Results on Flickr," American Association for Artificial Intelligence, 2008, 11 pages.

Li, Jia et al., "Automatic Linguistic Indexing of Pictures by a Statistical Modeling Approach," IEEE Transactions on Pattern Analysis and Machine Intelligence, vol. 25, No. 9, 2003, pp. 1075-1088.

Liu, F. et al., "Personalized Web Search by Mapping User Queries to Categories," in CIKM'02, 2002, pp. 558-565.

Liu, Jing et al., "An Adaptive Graph Model for Automatic Image Annotation," MIR'06, Oct. 26-27, 2006, Santa Barbara, California, ACM, pp. 61-69.

Mobasher, Bamshad et al., "Automatic Personalization Based on Web Usage Mining: Web Usage Mining Can Help Improve the Scalability, Accuracy, and Flexibility of Recommender Systems," Communications of the ACM, vol. 43, No. 8, 2000, p. 142-151.

Mori, Yasuhide et al., "Image-to-Word Transformation Based on Dividing and Vector Quantizing Images with Words," in First International Workshop on Multimedia Intelligent Storage and Retrieval Management, 1999, 9 pages.

Noll, Michael G. et al., "Web Search Personalization via Social Bookmarking and Tagging," The Semantic Web, 2007R, 14 pages.

Ntoulas, A. et al., "Detecting Spam Web Pages Through Content Analysis," in WWW '06, 2006, pp. 83-92.

Rubin, Daniel L. et al., "Medical Imaging on the Semantic Web: Annotation and Image Markup," Association for the Advancement of Artificial Intelligence, 2007, 6 pages.

Saber, Eli et al., "Automatic Image Annotation Using Adaptive Color Classification," Graphical Models and Image Processing, vol. 58, No. 2, 1996, pp. 115-126.

Sebe, Nicu et al., "Personalized Multimedia Retrieval: The New Trend?," MIR'07, Sep. 28-29, 2007, Augsburg, Bavaria, Germany, ACM, pp. 299-306.

Shen, Xuehua et al., "Implicit User Modeling for Personalized Search," CIKM'05, Oct. 31-Nov. 5, 2005, ACM, pp. 824-831.

Sieg, Ahu et al., "Web Search Personalization with Ontological User Profiles," CIKM'07, Nov. 6-8, 2007, Lisboa, Portugal, ACM, pp. 525-534.

Speretta, M. et al., Personalized Search Based on User Search Histories, in Web Intelligence'05, 2005, pp. 622-628.

Srikanth, Munirathnam et al., "Exploiting Ontologies for Automatic Image Annotation," SIGIR'05, Aug. 15-19, 2005, Salvador, Brazil, ACM, pp. 552-558.

Sugiyama, K. et al., "Adaptive Web Search Based on User Profile Constructed Without Any Effort from Users," in WWW'04, 2004, pp. 675-684.

Teevan, Jaime et al., "Personalizing Search Via Automated Analysis of Interests and Activities," SIGIR'05, Aug. 15-19, 2005, Salvador, Brazil, ACM, pp. 449-456.

(56) References Cited

OTHER PUBLICATIONS

Xu, Songhua et al., "A User-Oriented Webpage Ranking Algorithm Based on User Attention Time," Proceedings of the 23$^{rd}$ AAAI Conference on Artificial Intelligence, 2006, pp. 1255-1260.

Xu, Songhua et al., "Personalized Online Document, Image and Video Recommendation Via Commodity Eye-Tracking," RecSys'08, Oct. 23-25, 2008, Lausanne, Switzerland, ACM, pp. 83-90.

Xu, Songhua et al., "Personalized Web Content Provider Recommendation through Mining Individual Users' QoS," ICEC'09, Aug. 12-15, 2009, Taipei, Taiwan, ACM, pp. 89-98.

Xu, Songhua et al., "Yale Image Finder (YIF): a New Search Engine for Retrieving Biomedical Images," Bioinformatics, vol. 24, No. 17, 2008, pp. 1968-1970.

* cited by examiner

RECOMMENDING PERSONALLY INTERESTED CONTENTS BY TEXT MINING, FILTERING, AND INTERFACES

RELATED APPLICATION

This application claims the benefit of priority of U.S. Provisional Pat. App. No. 61/607,800 filed Mar. 7, 2012 and titled "Recommending Personally Interested Contents by Text Mining, Filtering, and Interfaces," which is incorporated by reference.

STATEMENT REGARDING FEDERALLY SPONSORED RESEARCH AND DEVELOPMENT

This application was made with United States government support under Contract No. DE-AC05-00OR22725 awarded by the United States Department of Energy. The United States government has certain rights in these inventions.

BACKGROUND

1. Technical Field

This disclosure relates to text mining and content recommendations through automated analysis of user activities or events that may include on-line reading, writing, browsing, and/or navigation, for example.

2. Related Art

Search engine rankings may provide information about selected topics or answer specific questions. Unfortunately some search engines cannot return the latest information about a topic or question when that information has not had sufficient time to establish its cyber reputation. Additionally, many Web search services require user to compose their own Web queries. To receive sought after information, the search engines require the users to ask the right questions and convey those questions through a required language expression following a specific query structure. Besides its counter-intuitive nature, such queries directed to sought-after information may not exist.

Unfortunately, most of the search engines do not offer an integrated experience of one stop information shop for any user. Unlike known technology, the technology disclosed in the Detailed Description that follows, un-intrusively observes the user's own information consumption behaviors in time, automatically infers that user's information interests, and proactively recommends personally high-value content for the user under a given context of a certain information consumption mode of the user (such as 9 am Monday morning, later Sunday afternoon, or during Christmas holidays). Some of the systems described in the Detailed Description do not require a more tactic query formulation or manual information searching and end-user filtering. The new technology discloses recommendation techniques and focuses on proactively delivering relevant content to an end user in a personalized way.

DETAILED DESCRIPTION OF THE PREFERRED EMBODIMENTS

Figure 1:
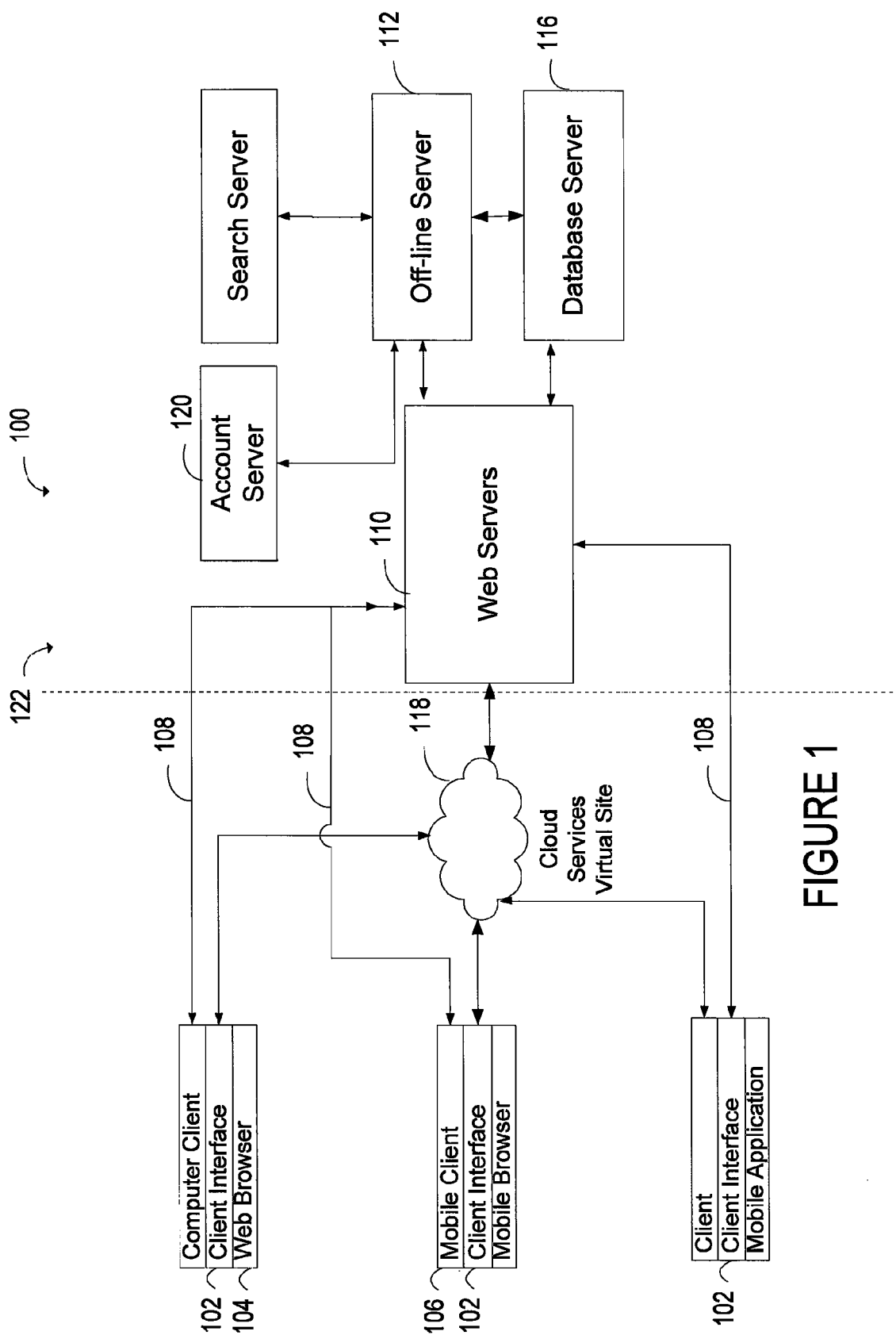
FIG. 1 is a block diagram of an exemplary architecture.
Figure 2:
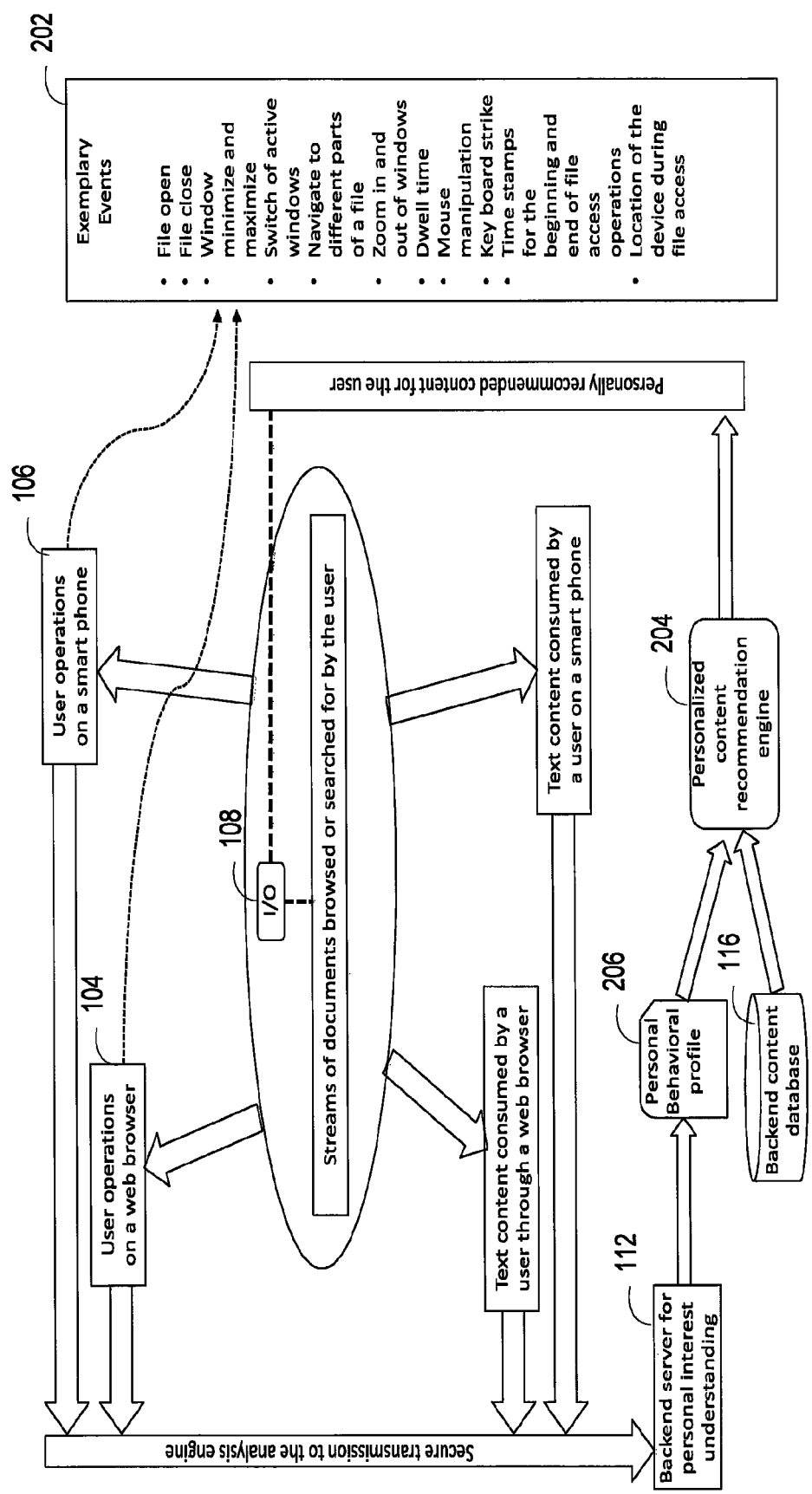
FIG. 2 is a functional diagram of an exemplary process.

The disclosed customized system 100 shown in FIG. 1 includes front end client interfaces (or client interface device) 102 that may run on an array of remote clients through a background processing. Some front end client interfaces 102 are embedded in hardware allowing the system 100 to directly connect to other front end system buses. Alternative front end client interfaces 102 comprise software, applications, or plug-ins that are integrated into larger software applications such as a Web browser 104 that resides on a client device in a client/server architecture. The client interfaces 102 may be retained in a non-transient media and may be executed on one or multiple stationary or mobile computing devices 106 or platforms that may execute Windows OS, Apple/Macintosh OS, Linux OS, iPad OS, iPhone OS, Android OS, and other operating systems (OSs). The front end client interfaces 102 may render the same look and feel and possess functionality that captures user operations and activities (e.g., user events) when a user is accessing and/or consuming content from remote content providers. Exemplary user events 202 (shown in FIG. 2) may occur during online reading, browsing, writing, and/or navigation. The front end client interface 102 records a time stamped user behavior record in the user device's local cache. A user event may also occur when a user opens, closes, scrolls within, and/or zooms in/out of a particular part of content in a computer rendered document, object, or file that may be displayed on a visual output device. In other words, a user event may be an action or occurrence generated by a user, to which a program might respond, for example, key presses, button clicks, a gesture on a touch sensitive display or mouse movements. The document or file affected by the user event may comply with an electronic document specification such as the TXT, PDF, DOC, PPT, or HTML file format.

Some front end client interfaces 102 may capture other time stamped user events too such as executing a file saving routine, a forwarding routine, a bookmarking routine, a printing routine, switching between active and inactive windows in one or multiple window-based programs, typing, physical or manual gestures, hand strokes, and/or other user actions performed on the computing device. Through a multi-task process, the client interface 102 may extract a portion of the consumed content that is currently under view by the user and the address of the consumed content (e.g., Uniform Resource Locator or URL). The consumed content may comprise a parsed Hypertext Markup Language (HTML) file or a PDF or Word or TXT file that may be substantially free of content relevant to the user's personal information interests such as ads, navigation bars, tags, redirection links, navigation links, etc., that are detected and removed through one or more front end client filters on the client device that are file format dependent (e.g., advertisement content filters for HTML files). The content filters may run on the client device and/or on backend servers.

Through a parallel processing with the consumed content extraction, the front end client interface 102 may request or extract a content signature (through a process executed on a cloud based computing platform 118 although it can also be executed on other platforms in alternative systems) for the parsed text currently under view or edited by the user. Such a content signature may include multiple semantically salient content elements embodied in the text, the address of the content, and respective densities of semantic topics embodied in the text, whose detection methods are executed by the system and methods described in the Appendices or in U.S.

Provisional Pat. App. No. 61/607,800, which is incorporated by reference. A cloud or cloud based computing platform 118 may refer to a scalable platform that provides a combination of services including computing, durable storage of both structured and unstructured data, network connectivity and other services. Metered services provided by a cloud or cloud based computing platform 118 may be interacted with (provisioned, de-provisioned, or otherwise controlled) via one or more front end client interfaces 102.

Consumed content at the screen snapshot level may be identified through a comparison of time stamps of adjacent snapshots. If a time difference between two user events lies within an interval the system 100 may infer a user's content consumption. The duration needs to be within a certain reasonable range to establish a user's interaction with a piece of content. For example, the duration may have a lower limit or low threshold that establishes that a user is viewing content (e.g., rather than just passing through it) and an upper limit or high threshold that may establish that a user is not ignoring the content. In these systems the limits that define the durations may be tunable or adaptable (e.g., programmable) to a user's information browsing or consuming behavior and in some instances, may also reflect if the content is focused. In other words, if received content is fully or partially occluded (e.g., defocused), such as when a portion of the rendered content is entirely or partially blocked by an active window in a windows-based environment, the content may be designated not consumed by appending or corresponding an inactive status identifier to its immediately previous time stamp. When the received content regains focus, in other words it is re-displayed in an active window the content may be designated active at that instance by appending or corresponding an active status identifier to its immediately preceding time stamp in another snapshot.

As a content signature is generated, it is appended to the corresponding time stamped user behavior record and to the parsed file (e.g., a parsed HTML file) to render a snapshot. The snapshots, also known as contextual user information consumption behavior data, short for contextual user behavior data, may be encrypted with an encryption validation code at the client and periodically transmitted to a perimeter network that may include a Web server or cluster 110 linked to the front end client interfaces 102 through a publicly accessible distributed network 108. A server may refer to one or more computers and/or programs stored on a non-transient media that respond to commands received from the client devices or applications. In some systems and processes it is a machine's or software application's role that establishes it as a server. And, some methods generate snapshots by appending a time stamp to a user's behavior record, and a file parsed from a monitored user information stream.

In some systems, transmissions occur according to an incremental schedule. Initially, snapshots may be transmitted in real time. A real time process may match a human's perception of time or a virtual process that is processed at the same rate (or perceived to be at the same rate) as a physical or an external process. This may occur as behavioral profiles are first created or the snapshots demonstrate a strong shift in the user's interest. As personal behavioral profiles 206 (stored in a memory or the database server 116) are established and are substantially unchanging (e.g., within three standard deviations of an existing profile, for example), transmissions from the front-end client interface 102 may decline and may occur according to a batch schedule. When network connections are lost, snapshots are buffered on the client device until the network connection is restored that may occur through a callback. A callback may comprise a scheme where a connection or a recommending session is broken and a subsequent connection or recommending session is automatically or manually re-established to facilitate additional data interchanges between the front end client interfaces 102 and the Web server or cluster 110.

Upon verification of the encryption validation code, the perimeter network and Web server 110 will direct the front end client interfaces 102 or the Web browser 104 it may plug into to clear the client side cache by transmitting a command, an acknowledgement through the publicly accessible distributed network 108, or through cache control directives. An off-line server 112 isolated from the front end client interfaces 102 may automatically query the Web server 110 asynchronously or on a periodic schedule through an intervening firewall and private network like a Local Area Network (LAN) 114. Upon initiation of the query, a connection channel may be established with the perimeter network and Web server 110 to receive snapshots, which may then be removed from or made inaccessible to the Web server 110 so that only the off-line server 112 and a database server 116 store the snapshots and any associated files in a record pool. The off-line server 112 controls the timing and activation of the transfer of the snapshots to the database server 116 via the private LAN 114 to minimize the risk and exposure to untrusted networks and compromised systems. The private network is configured to support high volume traffic with the perimeter network and the back end systems 122.

To better deliver relevant content to the user without having the user manually express the user's interests through search queries, the contextual user behavior data are parsed to generate the personal behavioral profile 206. A recommendation engine 204 resident to the off-line server 112 detects topic phrases that comprise one or more words, their frequencies and durations within a snapshot. If a user consumes content through multiple devices, using multiple browsers and front end client interfaces 102, operating on similar or disparate operating systems, the snapshots are linked together according to the timestamps, integrated into a single user record pool and processed individually. In one implementation each topic phrase is associated with a salience score that indicates the user's interest in a particular phrase under a certain context of the user's information consumption mode, such as holiday mode, Monday morning office mode, or vacation mode.

The recommendation engine's 204 conversions from the phrase level to an object (e.g., an entity exchanged), page, or document level may consider multiple aspects including those system and methods described in U.S. Provisional Pat. App. No. 61/607,800, in which concept words in the Provisional patent application (and Appendices 1-6) refer to the term "topic phrases" as used in this disclosure. In addition to those systems and methods, alternative aspect may be the frequency of an individual phrase of interest that may have a relatively high salience score. A document containing two interest points may be given more weight than a document having one interest point provided that the semantic relations between the interest points are distinguishable and represent discriminate concepts. Phrase inhibitors (e.g., avoided topic phrases) and saturation topic phrases (e.g., occurrences in an object that are beyond a user's point of interest) are given weight in some processes, just as the source of the content (e.g., originating from a government source such as the USPTO patent site; a corporate source, etc.); the user's preferred sources (e.g., prefers US news to British BBC news), the timing of a user's request (e.g., morning, afternoon, evening, day of the week, etc.); a user's location (e.g., via a Global Positioning Service (GPS) the system may identify whether the user is at home or on vacation), the user's consumption mode, and/or etc. may also contribute to a document's utility score or a priority score that establishes the ranking, or relevance of the document to the user's information needs at a particular moment. Higher utility scores or priority scores for objects and/or documents (when compared to each other) may reflect that some objects and/or documents include content that is designated well-matched with the personal interest of a user. A user's consumption mode in some systems 100 may comprise a user's designation that occurs at the front end client interfaces 102 that tags requests or queries to a classification, such as school classification, social classification, work classification (e.g., a working mode may include: job1, job2, etc.), religious classification, or other classification.

An exemplary document or object (referred to as document) scoring process may establish C as the corpus for a set of all documents, a as the author for whom to score the document, and $C_{a,i}$ as the set of all documents have a coauthor distance i from a. So then $C_{a,0}$ is the set of documents written by author a. Also, let $C_{a,i}^{(s)}$ be the set of documents that are a distance i to author a that contain the itemset s. Finally, let D be the document, page, or object (referred to as the document) to be scored, where a document is characterized as the set of all its frequent item sets, so that $\{s|s \in D\}$ is the set of all frequent itemsets in document D.

The weighted distance of a document D to the author a is given by $$\theta(a, D) \triangleq 2\left(\frac{1}{1+e^{-\beta dis(a,D)}} - \frac{1}{2}\right)$$

where dis(a, D) is the absolute coauthor distance from a to any author of document D, and $\beta$ is a free parameter.

The normalization factor for a frequent itemset s in a given document D is $$Nf(s, D) \triangleq (a, D) \sum_{s \in D} \sup^{\alpha}(s, D)$$

where $\propto$ is a free parameter and sup(s, D) is the support of an itemset s in a document D (i.e., the number of times s occurs in D).

The weight of a given itemset s with respect to an author a's documents is given by $$w(s, a) = \frac{|\{D \mid D \in C_a^{(s)}\}|}{|\{D \mid D \in C_a\}|} \sum_{D \in C_a} \frac{\sup(s, D)}{Nf(s, D)}$$

and the weight of the same itemset with respect to the document being scored is $$tf\_idf(s, D) \triangleq \frac{\sup(s, D)}{Nf(s, D)} \cdot \log_{10}\left(\frac{|\{D \mid D \in C\}|}{|\{D \mid D \in C_a\}|}\right).$$

The density of the itemset s in author a's documents is $$\rho_a(s, C_a) = \frac{1}{|\{D \mid D \in C_a\}|} \sum_{D \in C_a} \frac{\sup(s, D)}{Nf(s, D)}$$

and the density of the itemset in the entire corpus is $$\rho_c(s, C) = \frac{1}{7} \sum_{i=0}^{6} \sum_{D \in C_{a,i}} \frac{\sup(s, D) \cdot \theta(a, D)}{Nf(s, D)}$$

so the relative density of the itemset s with respect to the author a and the corpus is $$v(s, a, C) \triangleq \frac{\rho_a(s, C_a)}{\rho_c(s, C)}.$$

Using these definitions, an exemplary score of document D with respect to author a and corpus C may be expressed as $$\psi(D, a, C) \triangleq \sum_{s \in D} [w(s, a) \cdot tf\_idf(s, D) \cdot v(s, a, C)].$$

The relevant content delivered to the user devices may originate from many sources including caching proxies and surrogates. Originally, the content may be harvested from a back end content corpus rendered by an automated spider or bot executed through an account server 120. Alternatively, the searched content may be generated by a search service provider such as Google®, Bing®, or Yahoo® that may independently harvest information. The top content or documents, such as those identified by documents' utility or priority scores, may be recommended to the user through the content recommendation engine 204 and internal or external network. The result may be rendered through user devices through a hierarchical sequence with a priority-based display order so that content having higher utility scores is presented before lower scored content or the content may be presented through some other priority scheme such as taking the diversity between content into consideration when determining the content display order.

To maintain privacy and increase the relevance of content delivery, users may access and edit their own personal behavioral profiles by logging into the system. Through a remote graphical user interface (GUI) resident to the client devices, users may view the relevance of selected topic phrases to other topic phrases associated with their accounts. Some GUIs allow users to access and edit their behavioral profiles through social networks like Google®, Facebook®, Twitter®, LinkedIn®, and others that create user accounts and provide authentication services. Once authenticated, users may modify or delete phrases individually, by topic, or by group. Behavioral profiles may also be modified or automatically generated through email addresses and affiliation information. When an email address or affiliation information is received, the account server 120 may automatically retrieve content through an automated program that searches a publicly accessible distributed network like the Internet for content associated with the email address or affiliation information to modify or create personal behavioral profiles 206. For example, the account server may automatically harvest information from a user's homepage, a previous speech, blogs, or prior publications. The system may leverage such content to augment the captured information identified as relevant to the user.

Figure 3:
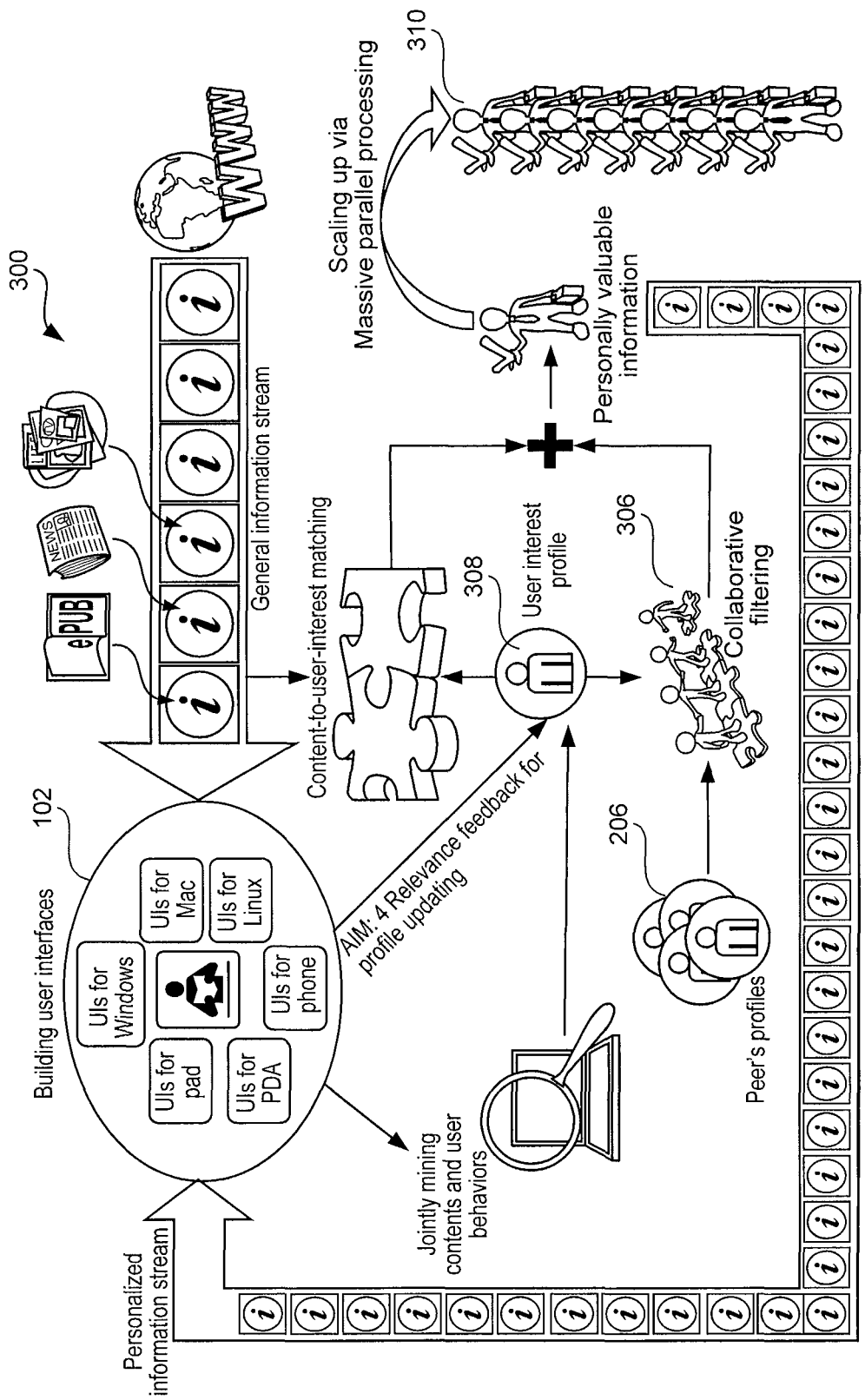
FIG. 3 is an alternative functional diagram of an exemplary process.
Appendices 1-6 describe a personalized re-ranking algorithm.

In alternative systems and processes content recommendations are not made solely according to a single personal behavioral profile. In this alternative shown in FIG. 3 users having similar profiles are aggregated into a virtual "hyper user" profile 308 stored in a memory or the database server 116 through a user-based collaborative filtering of a plurality of personal behavioral profiles 206 executed through the offline server 112. The collaborative filter 306 is resident to a non-transient media that is accessible and executable by the off-line server 112. The collaborative filter 306 that may comprise a collaborative personal information interest inference engine generates automatic predictions (filtering) about the interests of a user by collecting preferences from many users (collaborating). The engine may comprise a processor or a portion of a program retained in a non-transient media that determines how the program processes the personal behavioral profiles. The hyper user profile 308 may bridge behavior data from one real user to another real user of close resemblance and serve as a sample user to avoid highly redundant computation repeatedly performed for each user. The hyper user profile 308 may then be used to rank content with the highest rated content being delivered to the user through the Web server 110, publicly accessible distributed network 108, and optionally through the front end client interface 102. Based on the user feedback, some customized systems and processes 300 automatically monitor and detect whether and when a user's interests exhibit a statistically significant shift, upon which the system automatically updates the inferred personal behavioral profile of the user and may assign the user to a statistically different hyper user profile 308. Some customized systems and processes 300 are dynamic and autonomous self-tuning and are sensitive to changes in user's interest and drift.

To optimize system run-time efficiency and minimize computational overheads a parallel computing architecture 310 is implemented to increase the throughput of the systems 300. For each user group represented by a hyper user profile 308, computation may be executed independently from other groups and loads balanced through load balancers.

In another alternative system the front end client interfaces 102, Web server or cluster 110, and off-line server 112 may be implemented in software, encoded in a non-transitory signal bearing medium, or may reside in a memory resident to or interfaced to one or more processors or controllers that may support a tangible communication interface, wireless communication interface, or a wireless system. The memory may retain an ordered listing of executable instructions for implementing logical functions and may retain one or more engines that access files. The software is embodied in any non-transitory computer-readable medium or signal-bearing medium, for use by, or in connection with an instruction executable system, apparatus, and device, resident to system that may maintain a persistent or non-persistent connection with a destination. Such a system may include a computer-based system, a processor-containing system, or another system that includes an input and output interface that may communicate with a publicly accessible distributed network and/or privately accessible distributed network through a wireless or tangible communication bus through a public and/or proprietary protocol.

A personalized content recommendation system includes a client interface device configured to monitor a user's information data stream. A collaborative filter remote from the client interface device generates automated predictions about the interests of the user. A database server stores personal behavioral profiles and user's preferences based on a plurality of monitored past behaviors and an output of the collaborative user personal interest inference engine. A programmed personal content recommendation server filters items in an incoming information stream with the personal behavioral profile and identifies only those items of the incoming information stream that substantially matches the personal behavioral profile. The identified personally relevant content is then recommended to the user following some priority, that may consider the similarity between the personal interest matches, the context of the user information consumption behaviors that may be shown by the user's content consumption mode (that may be identified through such parameters as time of a day, day of the week, week of the year; year, user's location, and working mode of the user, for example). Some systems also consider the topic diversity between all the content recommended for the user at the moment.

A "computer-readable medium," "machine-readable medium," "propagated-signal" medium, and/or "signal-bearing medium" may comprise a non-transitory medium that contains or stores software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection having one or more wires, a portable magnetic or optical disk, a volatile memory such as a Random Access Memory (RAM), a Read-Only Memory (ROM), an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

The term "coupled" disclosed in this description may encompass both direct and indirect coupling. Thus, first and second parts are said to be coupled together when they directly contact one another, as well as when the first part couples to an intermediate part which couples either directly or via one or more additional intermediate parts to the second part. The term "substantially" or "about" may encompass a range that is largely, but not necessarily wholly, that which is specified. It encompasses all but a significant amount. When devices are responsive to commands events, and/or requests, the actions and/or steps of the devices, such as the operations that devices are performing, necessarily occur as a direct or indirect result of the preceding commands, events, actions, and/or requests. In other words, the operations occur as a result of the preceding operations. A device that is responsive to another requires more than an action (i.e., the device's response to) merely follow another action.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method of providing personalized content recommendations using a computer comprising:
   providing a user interface on a computing device that monitors a user's information; generating a content signature that includes semantically salient content elements from the monitored user's information, a network address to the monitored user's information that the semantically salient content is based upon, and a plurality of densities of topics embodied in the salient content elements;
   storing a personal behavioral profile in a memory of the computing device, the memory stored with user's preferences based on a plurality of monitored past behaviors and a collaborative filtering;
   filtering items in an incoming information stream with the personal behavioral profile and the content signature and responsive to a document ranking based in part on a plurality of phrase inhibitors and a plurality of saturation topic phrases; and receiving only those items of the incoming information stream that match and is responsive to the document ranking and the personal behavioral profile for a certain information consumption mode of the user.

2. The method of claim 1 where the computing device comprises a mobile computing device.

3. The method of claim 1 where the computing device comprises a non-mobile computing device.

4. The method of claim 1 further comprising displaying only those items of the incoming information stream that match the personal behavioral profile.

5. The method of claim 1 where the personal behavioral profile is based on a user event.

6. The method of claim 1 where the filtering comprises HTML filters that removes ads, navigation bars, tags, redirection links, and navigation links from the data stored in the memory.

7. The method of claim 1 further comprising extracting a content signature based on the monitored user information stream by modeling document level user's dwell times.

8. The method of claim 1 further comprising extracting the content signature based on the monitored user information by modeling dwell times.

9. The method of claim 1 further comprising extracting a content signature in response to inferring word level user dwell times.

10. The method of claim 1 further comprising identifying consumed content at a page level through a comparison of time stamps of the user's information stored in the memory.

11. The method of claim 1 further comprising generating snapshots by appending a time stamp to a user's behavior record, and a file parsed from the monitored user information.

12. The method of claim 1 where the personal behavioral profile comprises an aggregation of user profiles having similar characteristics.

13. The method of claim 1 further comprising automatically detecting a shift in the personal behavioral profile and applying a second personal behavioral profile in the filtering act.

14. A method of providing personalized content recommendations using a computer comprising:

providing a user interface on a computing device that a user's information generating a content signature that includes semantically salient content elements from the monitored user's information, a network address to the monitored user's information that the semantically salient content is based upon, and a plurality of densities of topics embodied in the salient content elements; stream;

storing a personal behavioral profile in a memory of the computing device, the memory stored with user's preferences based on a plurality of monitored past behaviors and a collaborative filtering;

filtering items in an incoming information stream with the personal behavioral profile;

and the content signature; receiving those items of the incoming information stream that match the user's interest profile for a certain information consumption mode of the user; and extracting the content signature based on the monitored user information and in response to modeling concept word level dwell times.

15. A personalized content recommendation system comprising:

a client interface device configured to monitor a user's information transmitted on a computer network;

a collaborative personal interest inference engine resident to a non-transient media and configured to generate automatic predictions about the interests of the user;

a database server stored with a personal behavioral profile and user's preferences based on a plurality of monitored past behaviors and an output of the collaborative personal interest inference engine for a plurality of user consumption modes respectively; and a server programmed to filter items in an incoming information stream with the personal behavioral profile and content signatures and programmed to identify only those items of the incoming information stream in response to the personal behavioral profile, the user's preferences, and based in part on a plurality of phrase inhibitors and a plurality of saturation topic phrases; where the content signatures include semantically salient content elements from the monitored user's information, a network address to the monitored user's information that the semantically salient content is based upon, and a plurality of densities of topics embodied in the salient content elements.

16. The system of claim 15 where the server assigns a priority score for each selected content designated well-matched with the personal interest of a user.

17. The system of claim 15 where the client interface device resides on a mobile computing device.

18. The system of claim 15 further comprising a display for rendering items of the incoming information stream that match one of the personal behavioral profiles of a user.

19. The system of claim 15 where the personal behavioral profile is based on a user event on a computing device.

20. The system of claim 15 further comprising a plurality of HTML filters that detects and removes ads, navigation bars, tags, redirection links, or navigation links from the user's information data stream.

21. The system of claim 15 further comprising a remote computing platform programmed to extract a content signature based on the monitored user information stream responsive to modeling document level user's dwell times.

22. A personalized content recommendation system comprising:

a client interface device configured to monitor a user's information transmitted on a computer network;

a collaborative personal interest inference engine resident to a non-transient media and configured to generate automatic predictions about the interests of the user;

a database server stored with a personal behavioral profile and user's preferences based on a plurality of monitored past behaviors and an output of the collaborate personal interest inference engine for a plurality of user consumption modes respectively;

a server programmed to filter items in an incoming information stream with the personal behavioral profile and programmed to identify only those items of the incoming information stream that matches the personal behavioral profile; and a computing platform programmed to extract a content signature based on the monitored user information stream responsive to modeling concept word level dwell times; where the content signatures include semantically salient content elements from the monitored user's information, a network address to the monitored user's information that the semantically salient content is based upon, and a plurality of densities of topics embodied in the salient content elements.

* * * * *